US008838757B2

(12) United States Patent
Temporelli

(10) Patent No.: US 8,838,757 B2
(45) Date of Patent: Sep. 16, 2014

(54) METHOD OF STARTING UP A COMPUTING DEVICE IN A NETWORK, SERVER AND NETWORK OF COMPUTING DEVICES FOR THE IMPLEMENTATION THEREOF

(75) Inventor: Frédéric Temporelli, Echirolles (FR)

(73) Assignee: Bull SAS, Les Clayes-Sous-Bois (FR)

( * ) Notice: Subject to any disclaimer, the term of this patent is extended or adjusted under 35 U.S.C. 154(b) by 166 days.

(21) Appl. No.: 13/381,334

(22) PCT Filed: Jun. 30, 2010

(86) PCT No.: PCT/FR2010/051368
§ 371 (c)(1),
(2), (4) Date: Mar. 26, 2012

(87) PCT Pub. No.: WO2011/001110
PCT Pub. Date: Jan. 6, 2011

(65) Prior Publication Data
US 2012/0179900 A1 Jul. 12, 2012

(30) Foreign Application Priority Data
Jul. 1, 2009 (FR) ...................................... 09 54481

(51) Int. Cl.
*G06F 15/177* (2006.01)
*G06F 9/44* (2006.01)
*H04L 29/12* (2006.01)

(52) U.S. Cl.
CPC .......... *G06F 9/4416* (2013.01); *H04L 61/2015* (2013.01)
USPC ............................ 709/222; 709/223; 709/229

(58) Field of Classification Search
USPC .................................. 709/227, 222, 223, 229
See application file for complete search history.

(56) References Cited

U.S. PATENT DOCUMENTS

| 7,835,274 B2* | 11/2010 | Chapman et al. ............. 370/229 |
| 2002/0095595 A1* | 7/2002 | Christopherson et al. .... 713/200 |
| 2003/0009657 A1* | 1/2003 | French et al. ..................... 713/2 |
| 2003/0088650 A1* | 5/2003 | Fassold et al. ................ 709/220 |
| 2005/0091387 A1* | 4/2005 | Abe .............................. 709/228 |
| 2006/0200539 A1* | 9/2006 | Kappler et al. ............... 709/220 |

(Continued)

FOREIGN PATENT DOCUMENTS

EP 1 503 282 A1 2/2005

OTHER PUBLICATIONS

Rschneid et al., "LinVDR bootet über NFS", obtained from the World Wide Web at page http://www.vdrportal.de/board/ thread. php?threadid=17346, May 20, 2004, pp. 1-36.

(Continued)

*Primary Examiner* — Anthony Mejia
(74) *Attorney, Agent, or Firm* — Miles & Stockbridge P.C.

(57) ABSTRACT

A method of starting up a computing device a network comprising a dynamic addressing module and a module for providing start-up files for the computing device comprising
   allocating to the computing device, by the dynamic addressing module, an address in the network;
   transmitting, by the computing device to the module for providing start-up files, at least one request (ReqB) for start-up files; and
   providing by the module for providing start-up files to the computing device, the start-up files in response to said at least one request.
The at least one request includes the address of the computing device, allocated by the dynamic addressing module, and the start-up files are provided by the file server with this address.

8 Claims, 4 Drawing Sheets

(56) References Cited

U.S. PATENT DOCUMENTS

| | | | |
|---|---|---|---|
| 2008/0046708 A1* | 2/2008 | Fitzgerald et al. | 713/2 |
| 2009/0164553 A1* | 6/2009 | Chiu | 709/202 |
| 2009/0276524 A1* | 11/2009 | Ohtani | 709/224 |
| 2011/0041124 A1* | 2/2011 | Fishman et al. | 717/170 |
| 2012/0030741 A1* | 2/2012 | Chai et al. | 726/6 |

OTHER PUBLICATIONS

Bruckner et al., "Cluster Node Install Guide", Opentech EDV-Research GmbH, Feb. 20, 2005, pp. i-iii and 1-11.

* cited by examiner

METHOD OF STARTING UP A COMPUTING DEVICE IN A NETWORK, SERVER AND NETWORK OF COMPUTING DEVICES FOR THE IMPLEMENTATION THEREOF

BACKGROUND OF THE INVENTION

This invention relates to a method of starting up a computing device in a network comprising a dynamic addressing module and a module for providing start-up files for said computing device. It also relates to a server for providing start-up files and a corresponding network.

A particular application related to this invention is the start-up of servers in a network comprised of a cluster of servers. In this type of installation, but also more generally in any installation of computing devices interconnected in a network, a dynamic addressing method is indeed a preferred implementation. For this, a dynamic addressing module is provided in the cluster of servers. When starting up a computer system in the cluster of servers, it initially has no network configuration, specifically no IP address. It therefore requests one from the dynamic addressing module by using a specific communication protocol, such as DHCP (Dynamic Host Configuration Protocol). More specifically, according to this protocol, a DHCP request is broadcast over the network by a BIOS (Basic Input Output System) application that verifies inputs and outputs, executed by a BIOS extension of the computer system's network card. This DHCP request is received by the dynamic addressing module, which returns the network configuration for the computer system, also by broadcasting over the network.

Once the BIOS application has obtained the network configuration for the computer system, it is then able to send a request to a module for providing start-up files in order to obtain files that allow it to carry out the process of starting up the computer system.

SUMMARY OF THE INVENTION

The invention more specifically applies to a start-up method as mentioned above, comprising the following steps:
  allocation to the computing device, by the dynamic addressing module, of an address in the network,
  transmission, by the computing device to the module for providing start-up files, of at least one request (ReqB) for start-up files, and
  provision, by the module for providing start-up files to the computing device, of these start-up files in response to said at least one request (ReqB).

Of the start-up files provided, some are applications likely to need the network configuration for the computer system again. The start-up process includes a step for loading an operating system using a specific application that, for any of its execution phases (for example, a phase commonly described as a "minimal system initialization" or "initrd", or a phase commonly described as a "network service"), requires knowledge of the network configuration. A new DHCP request is then broadcast over the network by this specific application, and a new response is sent by the dynamic addressing module, also by broadcasting over the network. There is currently no way for the operating system start-up application to retrieve the network configuration information supplied to the BIOS application by the dynamic addressing module. Therefore, at least two separate DHCP requests must be sent by the computer system when it starts up on the network.

In a cluster of servers, already highly occupied with executing powerful calculations, all of the generated DHCP addressing requests degrade the performance of other communication protocols using the network. It is particularly disadvantageous that data exchanges over the DHCP protocol are affected each time by a broadcast to all network nodes, known as a broadcast transmission. This therefore generates noise that would be advantageous to reduce.

A radical solution would be to remove all communication using the DHCP protocol from the network, which ultimately means not using a dynamic addressing system. It would then be necessary to define a static network configuration, including the IP address for each computing device on the network. In an application involving a cluster of servers, this solution would require a complicated network configuration mechanism when deploying each computing device, the persistence of network configuration information being then stored in the image for each device. It would then be likely that images would no longer be uniform across computing devices.

It may therefore be desirable to provide a method of starting up a computing device in a network that can at least partially overcome of the above problems and constraints.

The invention therefore relates to a method of starting up a computing device in a network comprising a dynamic addressing module and a module for providing start-up files for said computing device, comprising the following steps:
  allocation to the computing device, by the dynamic addressing module, of an address in the network,
  transmission, by the computing device to the module for providing start-up files, of at least one request (ReqB) for start-up files, and
  provision, by the module for providing start-up files to the computing device, of these start-up files in response to said at least one request (ReqB),
characterized in that, said at least one request comprising the address of the computing device, allocated by the dynamic addressing module, the start-up files are provided by the file server with this address.

Therefore, although there is currently no way for the start-up files provided by the file server, and specifically the operating system start-up application, to retrieve the network configuration information supplied to the BIOS application by the dynamic addressing module, if the address of the computing device in the network is provided by the module for providing start-up files with them during their transmission to the computing device, it is then no longer necessary to send the above mentioned second DHCP addressing request during the execution of the start-up process using the provided files, and the network is significantly less degraded. This advantage is particularly significant in the context of an HPC (High performance computing) calculator in a cluster of servers where the availability of the network for the calculations is of major importance.

Optionally, because the required start-up files include at least an operating system start-up application, the address of the computing device allocated by the dynamic addressing module is transmitted by the module for providing start-up files as a parameter for the operating system start-up application.

Also optionally, the address of the computing device allocated by the dynamic addressing module is transmitted by the module for providing start-up files as a parameter for the operating system's kernel in the operating system start-up application.

Also optionally, a method of starting up according to the invention may comprise the following steps:

execution at start-up, by the computing device, of a first BIOS application for verifying inputs and outputs, designed to carry out the emission of an addressing request over the network, including the broadcast of this request over the network using the DHCP protocol, execution after receipt of the start-up files, by the computing device, of the operating system start-up application based on the address supplied as a parameter.

Also optionally, exchanges between the computing device and the module for providing start-up files are established according to the HTTP communication protocol.

Also optionally, a method of starting up according to the invention may comprise the following steps:

extraction in said at least one request, by the module for providing start-up files, of the address of the computing device allocated by the dynamic addressing module, insertion, by the module for providing start-up files, of this address into data it provides to the computing device in response to said at least one request.

Also optionally, the dynamic addressing module and the module for providing start-up files are included in a single service node device of the network.

The invention also relates to the application of a method as defined above for starting up a processing node in a cluster of servers.

The invention also relates to a server for providing start-up files in a network of computing devices comprising:

means for receiving at least one request for start-up files sent by a computing device on the network, and means for providing these start-up files to the computing device that sent said at least one request, characterized in that, because said at least one request comprises the address of the computing device allocated by a dynamic addressing module on the network, the means for providing start-up files are designed to provide said start-up files with this address.

The invention also relates to a network of computing devices comprising:

a dynamic addressing module designed to provide an address in the network to a computing device upon receipt of an addressing request sent by such computing device, a server for providing files as defined above, and at least one computing device with means of sending at least one addressing request over the network and means of starting up using start-up files provided by the server for providing files.

BRIEF DESCRIPTION OF THE DRAWINGS

The invention will be better understood using the following description, given purely as an example and referring to the accompanying drawings, in which.

DETAILED DESCRIPTION

Figure 1:
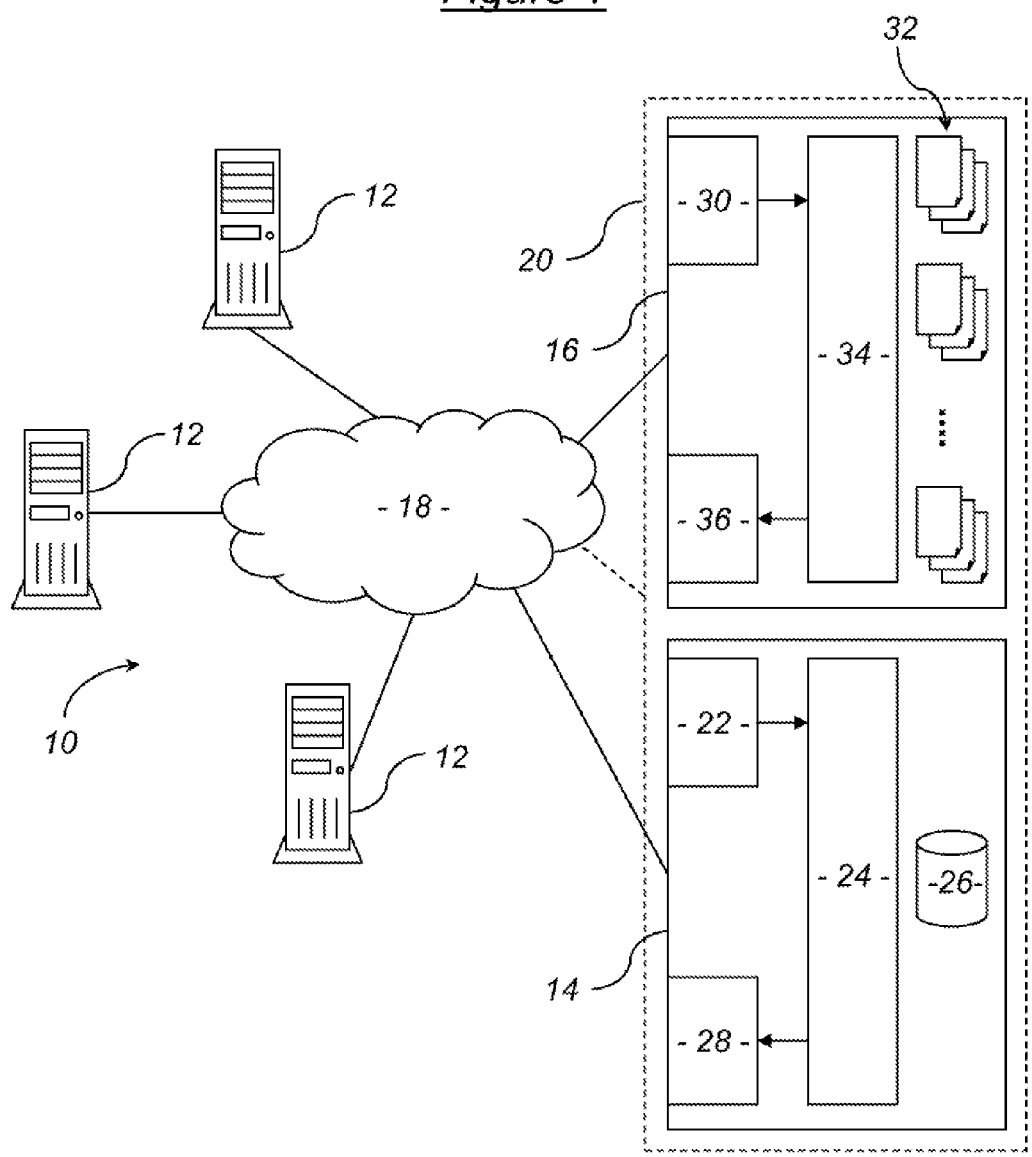
FIG. 1 schematically shows the general structure of a network of computing devices according to an embodiment of the invention.

The network 10 of computing devices 12, 14, 16, 20 illustrated in FIG. 1 is for example a very simplified and incomplete representation of an HPC calculator arranged in a cluster of interconnected servers using at least a data transmission network 18 with very high bandwidth. This network 10 comprises for example computing devices forming calculating nodes, identified by a common reference 12, and computing devices forming service nodes, including a dynamic addressing module 14 and a module for providing start-up files 16. The dynamic addressing module 14 and the module for providing start-up files 16 can reside on different servers, as shown in FIG. 1 using solid lines, or on a single server 20, as suggested using dashed lines. All of these computing devices may be equipped with Ethernet or Infiniband (trademarks) network cards.

More generally, the structure above is suitable for any type of network of computing devices, not necessarily an HPC structure, in which computing devices are started up over a network and by implementing a dynamic addressing protocol.

The dynamic addressing module 14 is more specifically designed to dynamically allocate a network configuration, specifically an IP (Internet Protocol) address, to each computing device 12 during a start-up phase on the network 10. In its communications with the other elements of the network 10, it implements for example the known DHCP protocol to perform this function. For this, it comprises:

an interface 22 for receiving addressing requests, a unit 24 for processing these requests based on data concerning the network that it stores in memory 26 for the dynamic allocation of network configurations, including IP addresses, and an interface 28 for sending messages including these configurations over the network 10.

Using the DHCP protocol, addressing requests and messages generated in response are broadcasted over the data transmission network 18.

The module 16 for providing start-up files is designed to provide, to each computing device 12 that sends a request over the network 10, parameters and application files needed for its full start-up, from the execution of a net-boot loader to the loading of an operating system. For this, it comprises:

an interface 30 forming a means for receiving requests for start-up files or parameters 32 sent by a computing device 12 on the network, a unit 34 for processing these requests and selecting start-up files and/or parameters according to the computing device 12 originating the request, and an interface 36 forming a means of transmitting selected start-up files and/or parameters.

According to the invention, the processing unit 34 of the module 16 for providing start-up files 32 is also designed to extract, from a received request, the IP address of the computing device 12 that sent it and to provide the interface 36 with this dynamically allocated IP address along with the selected files and/or parameters.

In a preferred embodiment, because the start-up files provided to the computing device 12 include at least one operating system start-up application, the IP address of the computing device 12 is transmitted by the module for providing start-up files 16 as a parameter for the operating system start-up application, specifically as a parameter for the operating system's kernel. By operating system's "kernel", this means the basic part of the operating system that manages the resources belonging to the related computing device 12 and allows its various components, hardware and software, to communicate with one another.

Figure 2:
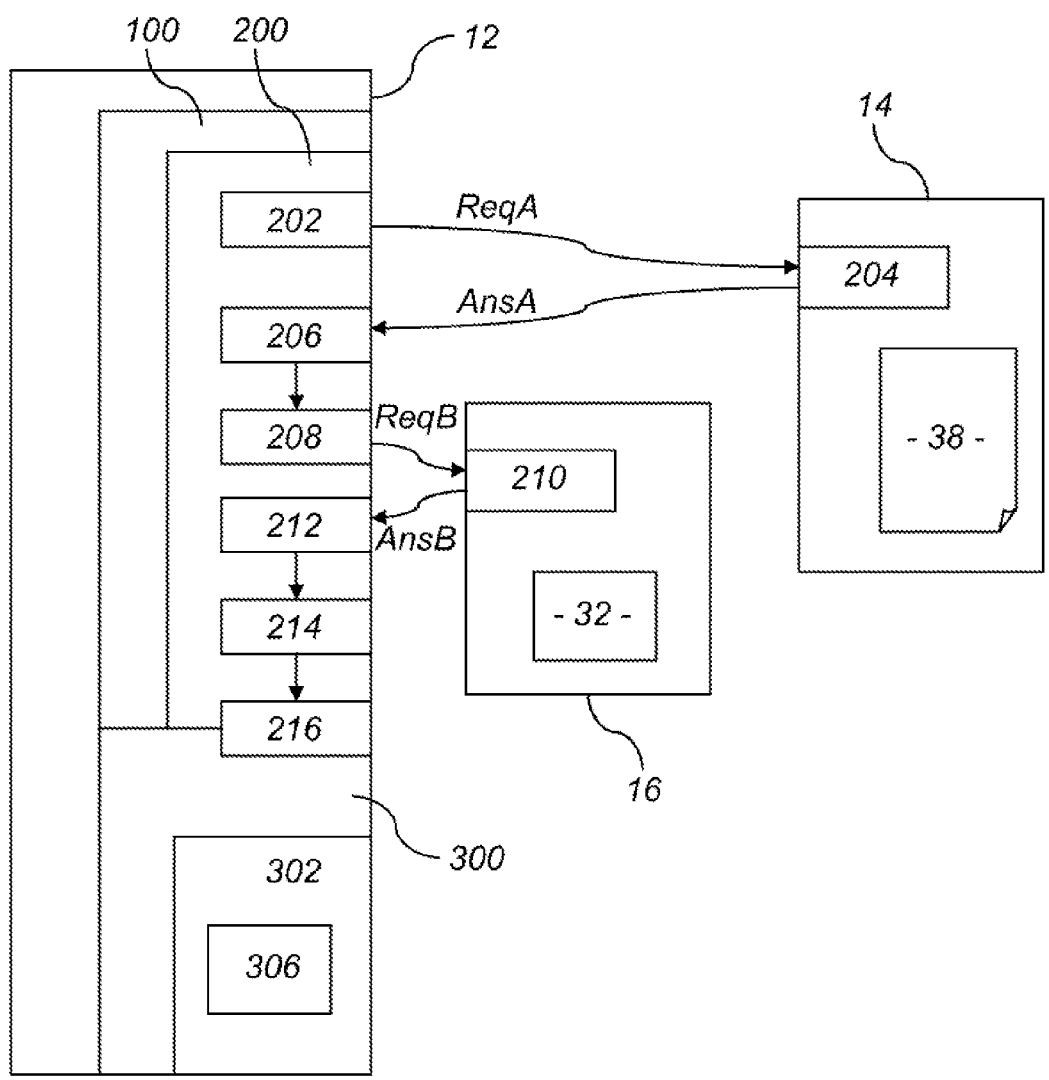
FIG. 2 illustrates the general successive steps of a method of starting up any computing device on the network in FIG. 1, according to an embodiment of the invention, FIG. 3 provides a detailed illustration of a first variant of the method in FIG. 2, and FIG. 4 provides a detailed illustration of a second variant of the method in FIG. 2.

A method of starting up any computing device 12 on the network 10 described previously will now be detailed with reference to FIG. 2.

During a first powering-on step 100, the computing device 12 executes the BIOS application for verifying inputs and outputs, traditionally stored in its motherboard's read-only memory. This BIOS application includes an automatic power test, called POST ("Power-On Self-Test"), performed at the beginning of this step in order to declare the disks, configure the components, and look for an operating system.

In this particular application where the computing device 12 is started up over a network using files and parameters provided by the module for providing start-up files 16, the BIOS application is executed by a BIOS extension of a network card on the computer device 12 that activates an environment 200 for executing the pre-boot, generally described as a PXE (Preboot Execution Environment) environment.

According to this environment 200 in which the microprocessor for the computing device 12 executes the BIOS application, a DHCP addressing requesting ReqA is broadcasted over the network 10 by the computing device 12 during a step 202.

This request ReqA is received by the interface 22 of the dynamic addressing module 14 during a step 204. Its processing unit 24 identifies the computing device 12 that sent the request through the MAC (Media Access Control) address of its Ethernet network card or the GUID (Global Unique Identifier) of its Infiniband network card, included in the request ReqA. Also based on the data 38 related to the network that the dynamic addressing module 14 stores in memory 26, the processing unit 24 assigns an IP address, using TCP/IP protocol, to the computing device 12.

More specifically, in the considered embodiment, the processing unit 24 generates a structured response AnsA based on data contained in a network configuration file 38 stored in memory. This response includes at least the following elements, extracted from the file 38:
- the IP address of the computing device 12,
- the IP address of the start-up file server 16,
- a network mask identifier for the computing device 12,
- a network gateway identifier for the computing device 12,
- a DNS (Domain Name System) identifier, and
- a PXE configuration application identifier needed for starting up the computing device 12.

The mask, gateway, and DNS identifiers are added onto the IP address.

The step 204 ends with broadcasting the response AnsA to the request ReqA over the network 10.

This response AnsA is received by the computing device 12 during a step 206. During this same step, the IP configuration for the network 10 is saved, and the TCP/IP protocol initialized, in the computing device 12.

Then, during a step 208, the computing device 12 sends a PXE configuration application request ReqB to the module for providing start-up files 16. This request is transmitted using the TCP/IP protocol and includes the PXE configuration application identifier received in the previous step.

The request ReqB is received by the module for providing start-up files 16 during a step 210. Its processing unit 34 identifies the computing device 12 that sent the request by extracting its IP address included in the request ReqB and generates a dynamic response AnsB including the required PXE configuration application from its start-up files 32 and at least some of the other configuration data received by the computing device 12 in the step 206, including the IP address mentioned above, depending on what was included in the request ReqB. Specifically, in the case where the PXE configuration application includes an operating system start-up application, the IP address for the computing device 12 (or more generally the IP address and its added element that define the network configuration for the computing device 12) is included in the response AnsB as a parameter for the operating system start-up application and can even be more precisely included, if applicable, as a parameter for the operating system's kernel.

The step 210 ends with the interface 36 transmitting the response AnsB to the computing device 12.

This response AnsB is received by the computing device 12 during a step 212. During this same step, the execution of the PXE configuration application is launched in the PXE environment 200.

Then, various successive phases, predefined in the PXE configuration application and identified by a common reference 214, are executed. They may include the recovery and execution of a boot load designed to launch the operating system for the computing device 12, an application for starting up the operating system and/or its kernel.

During a last step 216 executed in the PXE environment 200, the boot loader executes the operating system's kernel with the parameters provided by the module for providing start-up files 16, including the IP address of the computing device 12 and its added elements. During this step, the BIOS application ends and the operating system 300 is then executed by the microprocessor of the computing device 12.

In this new environment, successive phases identified by a common reference 302 are executed, specifically to start up the operating system correctly. Of these phases, for example the "initrd" phase or the "network service" phase, at least one requires knowledge of the network configuration, or at least the IP address, such as provided by the dynamic addressing module 14 in the step 204. But, according to the considered embodiment, the required network configuration information was transmitted by the module for providing start-up files 16 as a parameter to the operating system's kernel in the step 210, so that it is unnecessary to have to send another DHCP request to get it. The parameters for the operating system's kernel are processed during a step 306 to be able to continue executing that phase.

Figure 3:
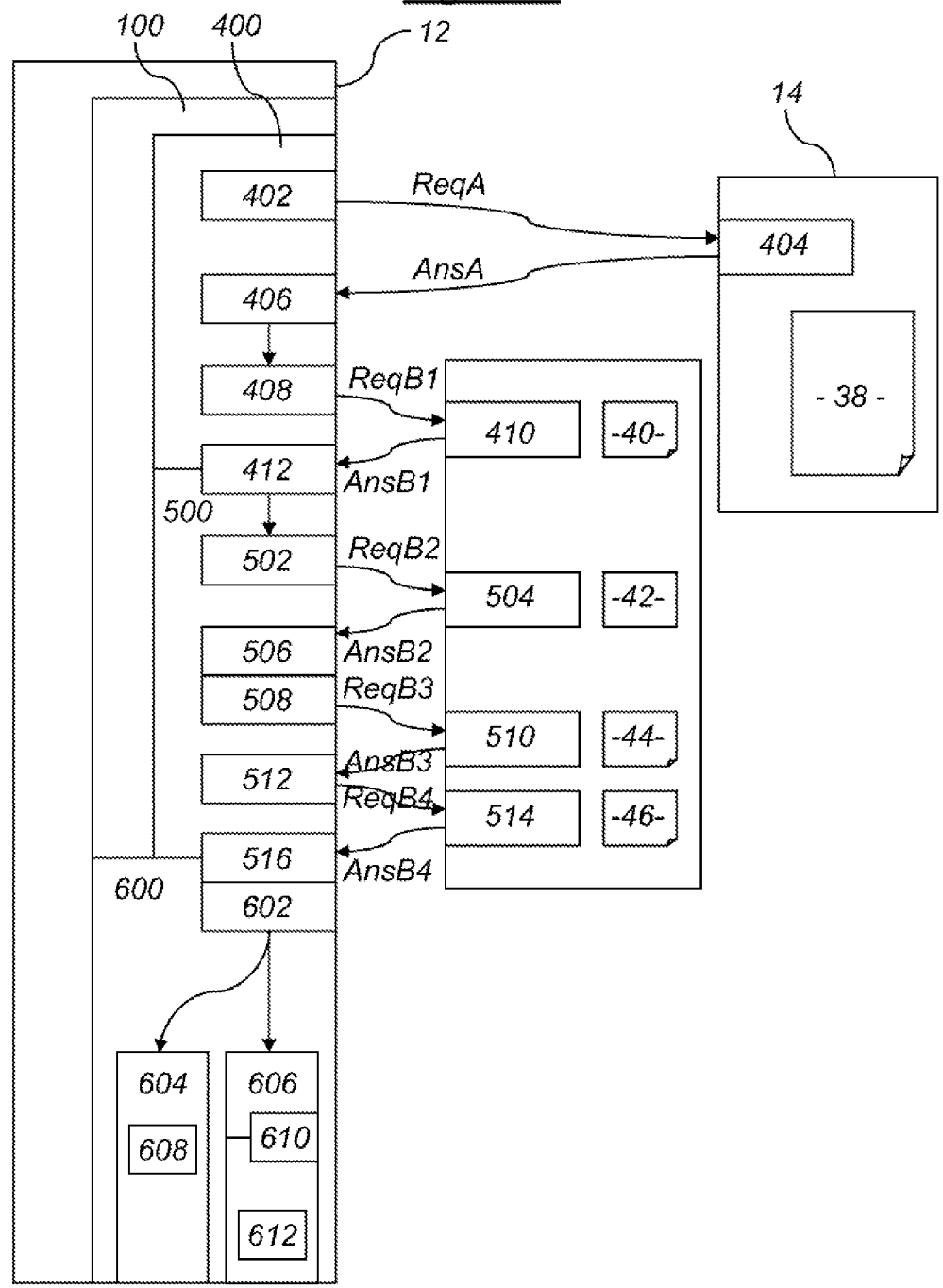

A first variant of the previously described method will now be detailed with reference to FIG. 3. According to this variant, an identifier for the PXE configuration application is not provided by the dynamic addressing module 14 in response to the request ReqA, but directly a boot loader identifier. In addition, also according to this variant, data is exchanged between the computing device 12 and the module for providing start-up files according to the TFTP (Trivial File Transfer Protocol) file transfer protocol.

This first variant includes the powering-on step 100, during which the computing device 12 executes the BIOS application to verify inputs and outputs. Similarly, the BIOS application is executed by the BIOS extension of the network card of the computing device 12 with the activation 400 of a PXE environment.

According to this PXE environment 400 in which the microprocessor of the computing device 12 executes the BIOS application, a DHCP addressing requesting ReqA is broadcasted over the network 10 by the computing device 12 during a step 402.

This request ReqA is received by the interface 22 of the dynamic addressing module 14 during a step 404. Its processing unit 24 identifies the computing device 12 that sent the request through the MAC address of its Ethernet network card or the GUID of its Infiniband network card, included in the request ReqA. Also based on the data 38 related to the network that the dynamic addressing module 14 stores in memory 26, the processing unit 24 assigns an IP address to the computing device 12.

More specifically, in the considered variant, the processing unit 24 generates a structured response AnsA based on data contained in a network configuration file 38 stored in memory. This response includes at least the following elements, extracted from the file 38:

the IP address of the computing device 12,
the IP address of the start-up file server 16,
a network mask identifier for the computing device 12,
a network gateway identifier for the computing device 12,
a DNS (Domain Name System) identifier, and
a boot loader identifier needed for starting up the computing device 12.

The step 404 ends with broadcasting the response AnsA to the request ReqA over the network 10.

This response AnsA is received by the computing device 12 during a step 406. During this same step, the IP configuration for the network 10 is saved, and the TFTP protocol initialized, in the computing device 12.

Then, during a step 408, the computing device 12 sends a boot loader request ReqB1 to the module for providing start-up files 16. This request is transmitted using the TFTP protocol and includes the boot loader identifier received in the previous step.

The request ReqB1 is received by the module for providing start-up files 16 during a step 410. Its processing unit 34 identifies the computing device 12 that sent the request by extracting its IP address, included in the ReqB1 request, and generates a dynamic response AnsB1 with the required boot loader 40.

The step 410 ends with the TFTP transmission of the response AnsB1 to the computing device 12.

This response AnsB1 is received by the computing device 12 during a step 412. During this same step, the execution of the received boot loader is launched. It ends the PXE environment 400.

During execution 500 of the received boot loader, the computing device 12 transmits a request ReqB2 for start-up parameters to the module for providing start-up files 16 during a step 502. This request is sent using the TFTP protocol.

It is received by the module for providing start-up files 16 during a step 504. Its processing unit 34 identifies the computing device 12 that sent the request by extracting its IP address, included in the ReqB2 request, and generates a response AnsB2 with at least the following elements 42:

an identifier of an operating system image ("initrd" application),
an identifier of this operating system's kernel, and
parameters for this kernel.

During this step, the IP address of the computing device 12 (or more generally the IP address and its added elements that identify the network configuration for the computing device 12) is included in the response AnsB2 as a parameter for the operating system's kernel.

This response AnsB2 is received by the computing device 12 during a step 506.

Then, during a step 508, the computing device 12 sends an operating system kernel request ReqB3 to the module for providing start-up files 16. This request is transmitted using the TFTP protocol and includes the operating system kernel identifier received in the previous step.

It is received by the module for providing start-up files 16 during a step 510. Its processing unit 34 identifies the computing device 12 that sent the request by extracting its IP address, included in the ReqB3 request, and generates a dynamic response AnsB3 with the required operating system kernel 44.

The step 510 ends with the TFTP transmission of the response AnsB3 to the computing device 12.

This response AnsB3 is received by the computing device 12 during a step 512. During this same step, the computing device 12 sends an "initrd" application request ReqB4 to the module for providing start-up files 16. This request is transmitted using the TFTP protocol and includes the "initrd" application identifier received in the step 506.

It is received by the module for providing start-up files 16 during a step 514. Its processing unit 34 identifies the computing device 12 that sent the request by extracting its IP address, included in the ReqB4 request, and generates a dynamic response AnsB4 with the required "initrd" application 46.

The step 514 ends with the TFTP transmission of the response AnsB4 to the computing device 12.

During a last step 516 of the execution 500 of the boot loader, the boot loader executes the operating system's kernel with the parameters provided by the module for providing start-up files 16 during the step 504, including the IP address of the computing device 12 and its added elements. During this step, the BIOS application ends and the operating system 600 is then executed by the microprocessor of the computing device 12.

In this new environment, the operating system's kernel continues its execution by launching the "initrd" application during a step 602 for an initialization of the devices of the computing device 12. Two scenarios are possible. Either the "initrd" application finds a file system on the network during its execution (step 604), or the operating system 600 switches to an actual minimum standard file system of the computing device 12 (step 606).

In the first scenario, the step 604 requires knowledge of the network configuration, or at least the IP address, such as provided by the dynamic addressing module 14 in the step 404. But, according to the considered embodiment, the required network configuration information was transmitted by the module for providing start-up files 16 as a parameter for the operating system's kernel in the step 504, so that it is unnecessary to have to send another DHCP request to get it. The parameters for the operating system's kernel are processed during a step 608 to be able to continue executing the step 604.

In the second scenario, during the step 606, the operating system 600 initializes the devices of the computing device 12 and then switches to the minimum standard file system (step 610). In this standard system, there is a phase 612 requiring knowledge of the network configuration, or at least the IP address, such as provided by the dynamic addressing module 14 in the step 404. The parameters for the operating system's kernel are processed during this phase to be able to continue executing the step 612.

Figure 4:
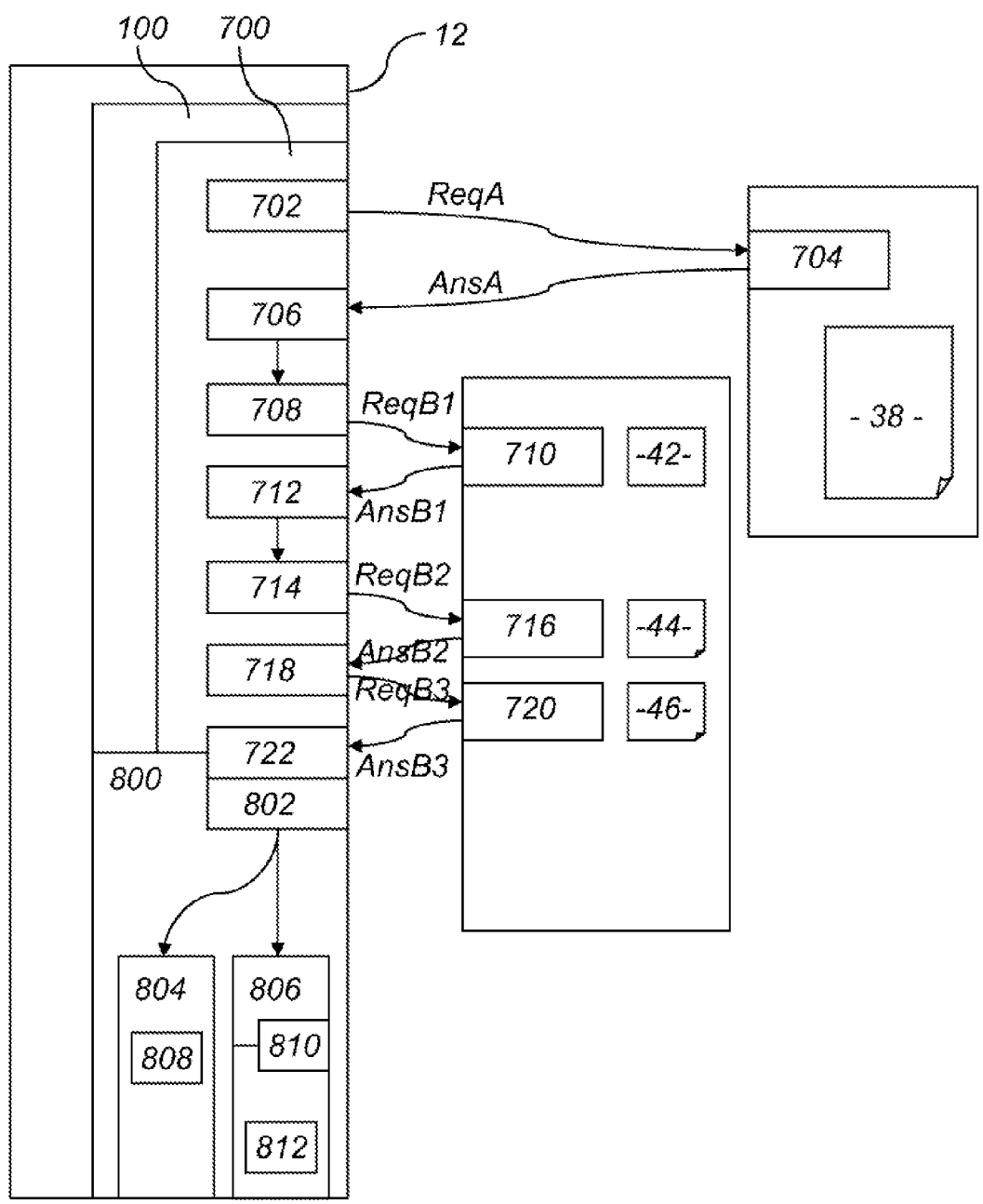

A second variant of the previously described method will now be detailed with reference to FIG. 4.

According to this second variant, during the powering-on step 100, the BIOS extension of the network card of the computing device 12 executes the BIOS application to verify inputs and outputs with the activation 700 of a PXE environment that already includes a boot loader. This is the case, for example, of the gPXE environment in Linux (trademarks). In addition, also according to this variant, data is exchanged between the computing device 12 and the module for providing start-up files according to the HTTP (HyperText Transfer Protocol) as it is allowed by the gPXE environment.

According to this gPXE environment 700 in which the microprocessor of the computing device 12 executes the BIOS application, a DHCP addressing request ReqA is broadcasted over the network 10 by the computing device 12 during a step 702.

This request ReqA is received by the interface 22 of the dynamic addressing module 14 during a step 704. Its processing unit 24 identifies the computing device 12 that sent the request through the MAC address of its Ethernet network card or the GUID of its Infiniband network card, included in the request ReqA. Also based on the data 38 related to the network that the dynamic addressing module 14 stores in memory 26, the processing unit 24 assigns an IP address, using TCP/IP protocol, to the computing device 12.

More specifically, in the second considered variant, the processing unit 24 generates a structured response AnsA based on data contained in a network configuration file 38 stored in memory. This response includes at least the following elements, extracted from the file 38:
- the IP address of the computing device 12,
- the IP address of the start-up file server 16,
- a network mask identifier for the computing device 12,
- a network gateway identifier for the computing device 12,
- a DNS (Domain Name System) identifier, and
- a gPXE configuration application identifier needed for starting up the computing device 12.

The step 704 ends with broadcasting the response AnsA to the request ReqA over the network 10.

This response AnsA is received by the computing device 12 during a step 706. During this same step, the IP configuration for the network 10 is saved, and the HTTP protocol initialized, in the computing device 12.

Then, during a step 708, the computing device 12 sends a request ReqB1 for start-up parameters to the module for providing start-up files 16. This request is sent using the HTTP protocol.

It is received by the module for providing start-up files 16 during a step 710. Its processing unit 34 identifies the computing device 12 that sent the request by extracting its IP address, included in the ReqB1 request, and generates a response AnsB1 with at least the following elements 42:
- an identifier of an operating system image ("initrd" application),
- an identifier of this operating system's kernel, and
- parameters for this kernel.

During this step, the IP address of the computing device 12 (or more generally the IP address and its added elements that identify the network configuration for the computing device 12) is included in the response AnsB1 as a parameter for the operating system's kernel. The extraction of the IP address and its inclusion in the response AnsB1 can be carried out by a PHP language script capable of generating a line of kernel parameters. This script can also be written in a language other than PHP, such as one of the following languages: Python, Java, Shell, C, etc.

This response AnsB1 is sent by the module for providing start-up files 16 using the HTTP protocol and is received by the computing device 12 during a step 712.

Then, during a step 714, the computing device 12 sends an operating system kernel request ReqB2 to the module for providing start-up files 16. This request is transmitted using the HTTP protocol and includes the operating system kernel identifier received in the previous step.

It is received by the module for providing start-up files 16 during a step 716. Its processing unit 34 identifies the computing device 12 that sent the request by extracting its IP address, included in the ReqB2 request, and generates a response AnsB2 with the required operating system kernel 44.

The step 716 ends with the HTTP transmission of the response AnsB2 to the computing device 12.

This response AnsB2 is received by the computing device 12 during a step 718. During this same step, the computing device 12 sends an "initrd" application request ReqB3 to the module for providing start-up files 16. This request is transmitted using the HTTP protocol and includes the "initrd" application identifier received in the step 712.

It is received by the module for providing start-up files 16 during a step 720. Its processing unit 34 identifies the computing device 12 that sent the request by extracting its IP address, included in the ReqB3 request, and generates a dynamic response AnsB3 with the required "initrd" application 46.

The step 720 ends with the HTTP transmission of the response AnsB3 to the computing device 12.

During a last step 722, the gPXE environment 700 executes the operating system's kernel with the parameters provided by the module for providing start-up files 16 during the step 710, including the IP address of the computing device 12 and its possible added elements. During this step, the BIOS application ends and the operating system 800 is then executed by the microprocessor of the computing device 12.

In this new environment, the operating system's kernel continues its execution as in the first variant. The steps 802, 804, 806, 808, 810, and 812, illustrated in FIG. 4, are therefore similar to the steps 602, 604, 606, 608, 610, and 612, illustrated in FIG. 3.

It clearly appears that a method as described previously, according to any one of the two non-limiting variants that have been detailed, limits the number of dynamic addressing DHCP requests when powering on a computing device in a network. This advantage is particularly significant in an HPC calculator application organized in a cluster of servers, where the network (servers and networks of data transmission) is also highly occupied with performing calculations.

The second variant also presents the advantage of the flexibility of the gPXE environment for communicating with the module for providing start-up files using the HTTP protocol.

Also note that the invention is not limited to the embodiment described previously. Specifically, it is not limited to the mentioned protocols (DHCP, TFTP, HTTP, IP, and TCP/IP), but rather extends to any other equivalent existing or future protocol.

More generally, as is known to those skilled in the art, there are various modifications that can be made to the embodiment described above, with respect to the instruction that has been disclosed. In the following claims, the terms used should not be interpreted as limiting the claims to the embodiment presented in this description, but should be interpreted to include all of the equivalents that the claims intend to cover by their formulation and whose projection is within reach of those skilled in the art by applying their general knowledge to the instruction that has just been disclosed.

The invention claimed is:

1. A method of starting up a computing device in a network comprising a dynamic addressing module and a module for providing start-up files for said computing device, the method comprising the following steps:
- allocating to the computing device, by the dynamic addressing module, an address in the network;
- transmitting, by the computing device to the module for providing start-up files, at least one request for start-up files, said at least one request for start-up files including the address of the computing device allocated by the dynamic addressing module;

providing, by the module for providing start-up files to the computing device, said start-up files in response to said at least one request for start-up files, said start-up files including at least one operating system start-up application;

extracting from said at least one request for start-up files, by the module for providing start-up files, the address of the computing device allocated by the dynamic addressing module; and inserting, by the module for providing start-up files, into said start-up files said address of the computing device allocated by the dynamic addressing module as a parameter of said at least one operating system start-up application which is to be sent to the computing device in response to said at least one request for start-up files.

2. The method of starting up according to claim 1, in which the address of the computing device allocated by the dynamic addressing module is transmitted by the module for providing start-up files as a parameter for an operating system kernel in the operating system start-up application.

3. The method of starting up according to claim 1, further comprising the following steps:

executing at start-up, by the computing device, a first BIOS application for verifying inputs and outputs designed to carry out the emission of an addressing request over the network, including the broadcast of said addressing request over the network using DHCP protocol;

executing after receipt of the start-up files, by the computing device, the operating system start-up application based on the address supplied as a parameter.

4. The method of starting up according to claim 1, in which exchanges between the computing device and the module for providing start-up files are established according to HTTP communication protocol.

5. The method of starting up according to claim 1, in which the dynamic addressing module and the module for providing start-up files are included in a single service node device of the network.

6. The method of starting up according to claim 1, wherein said computing device is a processing node in a cluster of servers.

7. A server for providing start-up files in a network of computing devices, comprising:

a first interface that receives at least one request for start-up files sent by a computing device on the network, said at least one request for start-up files including an address allocated to the computing device; and a second interface that provides said start-up files to the computing device that sent said at least one request, said start-up files including at least one operating system start-up application, wherein said server is configured to extract from said at least one request the allocated address of the computing device, and wherein said server is configured to insert into said start-up files said allocated address of the computing device as a parameter of said at least one operating system start-up application which is to be sent to the computing device in response to said at least one request for start-up files.

8. A network of computing devices comprising:

a dynamic addressing module configured to provide an address in the network to a computing device upon receipt of an addressing request sent by said computing device;

a server for providing files in a network of computing devices, the server comprising a first interface that receives at least one request for start-up files sent by a computing device on the network, said at least one request for start-up flies including the address of the computing device allocated by the dynamic addressing module; and a second interface that provides said start-up files to the computing device that sent said at least one request, said start-up files including at least one operating system start-up application, wherein the server is configured to extract from said at least one request for start-up files the address of the computing device allocated by the dynamic addressing module, and wherein the server is configured to insert into said start-up files said address of the computing device allocated by the dynamic addressing module as a parameter of said at least one operating system start-up application which is to be sent to the computing device in response to said at least one request for start-up files, and at least one computing device comprising an interface that sends at least one addressing request over the network, said computing device being configured to start-up using start-up files provided by the server for providing files.

* * * * *